Figure 1:
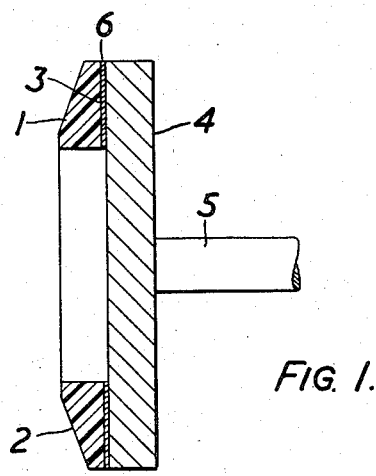

2,893,112

FRICTION MEMBERS HAVING SINTERED COMPOSITIONS

Norman C. Moore and John B. Huffadine, Northampton, England, assignors to The Plessey Company Limited, Ilford, England, a British company Application September 3, 1957, Serial No. 681,856

5 Claims. (Cl. 29—182.5)

This invention relates to friction materials suitable for use in brakes, clutches and similar apparatus.

Most friction materials in use at the present time incorporate organic materials which have the effect of limiting their use under severe conditions. For instance, in some cases "fade" will occur, while in others the coefficient of friction will be maintained only at the expense of a considerable increase in the rate of wear. In many applications the rate of wear is of considerable importance since it determines the frequency with which equipment has to be taken out of service for maintenance.

The present invention has for an object to provide an improved friction material having good resistance to wear without being unduly subject to fade.

According to the invention a friction material having very good resistance to wear while maintaining an adequate coefficient of friction may be prepared from a mixture of alumina with a molybdenum-chromium alloy. Since molybdenum and chromium form a continuous series of solid solutions, the composition of the alloy is readily adjusted to yield a material which has a coefficient of thermal expansion substantially similar to that of the alumina used for imparting frictional properties. The range of compositions of the friction material is from 5%–40% by weight of alumina, the remainder being the molybdenum-chromium alloy. One suitable alloy contains equal parts by weight of molybdenum and chromium.

*Example*

The requisite quantities of powdered molybdenum, chromium and alumina to yield a product containing 35% molybdenum 35% chromium and 30% alumina (by weight) are mixed by milling in a stainless steel ball mill for 16 hours. The mixed powder is hot pressed in a graphite die at a pressure of 1.5 t.s.i. and a temperature of 1600° C. for 5 minutes. Under these conditions of temperature and pressure the molybdenum and chromium combine to form an alloy, which becomes sintered together with the alumina.

The friction properties of the resultant material when used in conjunction with a cast-iron plate at a rubbing speed of 100 ft./min. and a pressure of 100 p.s.i. are Coefficient of friction 0.31.

Wear per hour at a loading of 1 H.P. per sq. in. .0003″.

These properties are quite reproducible. Unlike many cermet materials, this particular composition has excellent resistance to thermal shock and is thus well suited for use in applications where conditions are severe, e.g. bulldozer clutches, racing-car brakes and clutches, brakes on railway rolling stock, etc.

The material may be attached to the brake or clutch mechanism either by brazing, or by shrinking a steel collar on to a disc of it and then attaching the collar to the mechanism by conventional methods.

Figure 2:
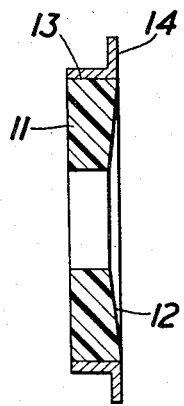

In the accompanying drawing Figs. 1 and 2 show two embodiments of friction members according to the invention, each in an axial section. In the embodiment of Figure 1 a friction element 1 according to the invention, which may be made by the method described in the above example, is formed as a ring having a cone surface 2 for use as the operative friction surface, and a flat back surface 3. The latter is applied to a metal disc 4 integral with or secured to a shaft 5, the connection between the friction element 1 and the plate 4 being effected by brazing as indicated at 6.

In the embodiment shown in Figure 2, the friction member comprises a friction element 11 which may likewise be made by the method described in the specific example given hereinabove, and which has a recessed cone surface 12 and a cylindrical outer surface 13. A flanged metal collar 14 is shrunk on to this cylindrical surface. In this manner the friction element is adequately secured in the collar 14 without any brazing or the like. The collar 14 may be attached by means of its flange, to a suitable carrier element in any convenient or conventional manner.

What we claim is:

1. A friction member for use in brakes, clutches, and similar apparatus, which comprises a supporting element made of metal and a friction element firmly attached thereto and consisting of a sintered mixture of 5 to 40 percent by weight of alumina with a molybdenum chromium alloy having substantially the same coefficient of thermal expansion as the alumina used.

2. A friction member for use in brakes, clutches, and similar apparatus, which comprises a supporting element made of metal and a friction element firmly attached thereto and consisting of a sintered mixture of 5 to 40 percent by weight of alumina with a molybdenum-chrominum alloy consisting of approximately equal parts by weight of molybdenum and chromium.

3. A friction member as claimed in claim 1 wherein the alumina content of the friction element is approximately 30% by weight.

4. A friction member as claimed in claim 1, wherein said friction element is attached to said metal element by brazing.

5. A friction member as claimed in claim 1, wherein said supporting element is a metal collar secured by shrinking to said friction element.

References Cited in the file of this patent

UNITED STATES PATENTS

| | | |
|---|---|---|
| 2,072,070 | Fisher | Feb. 23, 1937 |
| 2,470,269 | Schaefer | May 17, 1949 |
| 2,783,530 | Conant | Mar. 5, 1957 |

OTHER REFERENCES

Shevlin et al.: "WADC Technical Report," 54–173, Pt. I, pages 1, 2, 4, 5, 16.